(12) United States Patent
Wagner et al.

(10) Patent No.: US 10,347,942 B2
(45) Date of Patent: Jul. 9, 2019

(54) ELECTROLYTE FOR LITHIUM BASED ENERGY ACCUMULATORS

(71) Applicant: Bayerische Motoren Werke Aktiengesellschaft, Munich (DE)

(72) Inventors: Ralf Wagner, Muenster (DE); Dennis Gallus, Muenster (DE); Benjamin Streipert, Muenster (DE); Martin Winter, Muenster (DE); Johannes Kasnatscheew, Duelman (DE); Marius Amereller, Muenster (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 23 days.

(21) Appl. No.: 15/584,097

(22) Filed: May 2, 2017

(65) Prior Publication Data
US 2017/0244132 A1  Aug. 24, 2017

Related U.S. Application Data

(63) Continuation of application No. PCT/EP2015/075138, filed on Oct. 29, 2015.

(30) Foreign Application Priority Data

Nov. 3, 2014 (DE) ........................ 10 2014 222 372

(51) Int. Cl.
*H01M 10/0568* (2010.01)
*H01M 10/0569* (2010.01)
(Continued)

(52) U.S. Cl.
CPC ....... *H01M 10/0568* (2013.01); *H01M 4/131* (2013.01); *H01M 4/133* (2013.01);
(Continued)

(58) Field of Classification Search
None
See application file for complete search history.

(56) References Cited

U.S. PATENT DOCUMENTS

| 6,677,082 B2 | 1/2004 | Thackeray et al. |
| 6,680,143 B2 | 1/2004 | Thackeray et al. |
| (Continued) | | |

FOREIGN PATENT DOCUMENTS

| CN | 102403535 A | 4/2012 |
| CN | 102484284 A | 5/2012 |
| (Continued) | | |

OTHER PUBLICATIONS

Zhang, "A Review of the Electrochemical Performance of Alloy Anodes for Lithium-Ion Batteries," Journal of Power Sources, 2011, vol. 196, pp. 13-24 (Twelve (12) pages).

(Continued)

*Primary Examiner* — Daniel S Gatewood
(74) *Attorney, Agent, or Firm* — Crowell & Moring, LLP

(57) ABSTRACT

An electrolyte for a lithium-ion battery which includes lithium hexafluorophosphate and lithium 2-pentafluoroethoxy-1,1,2,2-tetrafluoroethanesulfonate. A lithium-ion battery which includes an electrolyte containing lithium hexafluorophosphate and lithium 2-pentafluoroethoxy-1,1,2,2-tetrafluoroethanesulfonate. A motor vehicle which uses a lithium-ion battery having electrolytes containing lithium hexafluorophosphate and lithium 2-pentafluoroethoxy-1,1,2,2-tetrafluoroethanesulfonate. The electrolyte can increase the service life of the lithium-ion battery.

18 Claims, 3 Drawing Sheets

(51) Int. Cl.
*H01M 10/0525* (2010.01)
*H01M 4/131* (2010.01)
*H01M 4/134* (2010.01)
*H01M 4/133* (2010.01)

(52) U.S. Cl.
CPC ....... *H01M 4/134* (2013.01); *H01M 10/0525* (2013.01); *H01M 10/0569* (2013.01); *H01M 2220/20* (2013.01); *H01M 2300/0031* (2013.01); *H01M 2300/0034* (2013.01); *H01M 2300/0037* (2013.01); *Y02E 60/122* (2013.01)

(56) References Cited

U.S. PATENT DOCUMENTS

| | | | |
|---|---|---|---|
| 7,205,072 B2 | 4/2007 | Kang et al. | |
| 2012/0244425 A1 | 9/2012 | Tokuda | |
| 2014/0377667 A1 | 12/2014 | Roschenthaler et al. | |
| 2015/0030939 A1* | 1/2015 | Amereller | H01G 11/06 |
| | | | 429/330 |
| 2015/0044573 A1 | 2/2015 | Roeschenthaler et al. | |

FOREIGN PATENT DOCUMENTS

| | | |
|---|---|---|
| DE | 101 54 912 B4 | 11/2007 |
| DE | 10 2011 052 156 A1 | 1/2013 |
| DE | 10 2012 101 669 A1 | 8/2013 |
| DE | 10 2012 101 670 A1 | 8/2013 |
| WO | WO-2013127864 A1 * | 9/2013 ............. H01G 11/06 |

OTHER PUBLICATIONS

German-language Search Report issued in counterpart German Application No. 10 2014 222 372.5 dated Sep. 1, 2015 with partial English translation (13 pages).
International Search Report (PCT/ISA/210) issued in PCT Application No. PCT/EP2015/075138 dated Jan. 11, 2016 with English translation (5 pages).
German-language Written Opinion (PCT/ISA/237) issued in PCT Application No. PCT/EP2015/075138 dated Jan. 11, 2016 (5 pages).
Xu et al., "Recent Progress in Cathode Materials Research for Advances Lithium Ion Batteries", Material Science and Engineering R 73, 2012, pp. 51-65.
Chinese-language Office Action issued in counterpart Chinese Application No. 201580058834.0 dated Nov. 5, 2018 with English translation (12 pages).

* cited by examiner

ELECTROLYTE FOR LITHIUM BASED ENERGY ACCUMULATORS

CROSS REFERENCE TO RELATED APPLICATIONS

This application is a continuation of PCT International Application No. PCT/EP2015/075138, filed Oct. 29, 2015, which claims priority under 35 U.S.C. § 119 from German Patent Application No. 10 2014 222 372.5, filed Nov. 3, 2014, the entire disclosures of which are herein expressly incorporated by reference.

BACKGROUND AND SUMMARY OF THE INVENTION

The present invention relates to an electrolyte for lithium-based energy storage systems.

Electrolytes, namely conducting salts in solution, in solvents, or in a polymer matrix, are ubiquitous in and vital to all electrochemical apparatuses and their basic function is independent of the chemistry and the widely diversified application possibilities of those apparatuses. The role of electrolytes in electrolytic cells, capacitors, fuel cells or batteries is in each case the same: they serve as a medium for the transmission of charges in the form of ions between a pair of electrodes.

Conceptually, for the electrolyte there ought to be no net chemical changes during the operation of the battery, and all Faraday processes ought to be completed within the electrodes. In greatly simplified terms, therefore, the electrolyte may be viewed as an inert component in the battery, and must therefore display stability toward both cathode surfaces and anode surfaces. This electrochemical stability on the part of the electrolyte, which in actual devices is realized typically in a kinetic way (passivation) and not thermodynamically, is particularly important for rechargeable battery systems, albeit being difficult to fulfill on account of the strong oxidizing and reducing nature of cathode and anode.

A fundamental prerequisite for the constituents used in the electrolyte for lithium-ion batteries, especially solvents, therefore, is that they be anhydrous or, more precisely, aprotic—in other words, that the solvent contain no active protons able to react with lithium. The solvent, moreover, ought to be in a liquid state within the service temperature range.

A disadvantage of the conventional electrolytes for lithium-ion batteries, based on lithium hexafluorophosphate in carbonates, lies in particular in the low oxidative stability of 4.5 V versus Li/Li$^+$. The electrolyte is stable only up to this voltage, while outside of this range there is oxidative decomposition of the electrolyte and, in association therewith, dissolution of the cathode material. For lithium-ion batteries with high energy density or high power density as well, which preferably use lithium nickel manganese cobalt mixed oxides (NMC), or lithium nickel manganese oxide (LNMO) as active material for the positive electrode, electrolyte decomposition and cathode-material dissolution occur at end-of-charge voltages above 4.4 V or 4.7 V versus Li/Li$^+$, respectively. The consequence is a low cycling stability and hence short lifetime of the battery.

DE 102012101669 A1 discloses an electrolyte for a lithium-ion battery, containing the conducting salt lithium 2-pentafluoroethoxy-1,1,2,2-tetrafluoroethanesulfonate.

It is an object of the present invention to provide an electrolyte for lithium-ion batteries with improved stability.

This and other objects of the invention are achieved by providing an electrolyte for a lithium-ion battery, which contains lithium hexafluorophosphate and lithium 2-pentafluoroethoxy-1,1,2,2-tetrafluoroethanesulfonate. The present invention also provides a lithium-ion battery including such electrolytes, and a motor vehicle which uses a lithium-ion battery having such electrolytes.

For all aspects of the invention, where it is possible to use them, the following definitions apply.

Lithium-Ion Battery

As used herein, the terms "lithium-ion battery", "lithium ion battery", "rechargeable lithium-ion battery", and "lithium-ion secondary battery" are used synonymously. These terms also refer to "lithium battery", "lithium-ion accumulator", and "lithium-ion cell", and also including all lithium or alloy batteries, including in particular Li-sulfur and/or alloy systems. The term "lithium-ion battery" is therefore used as a collective term for the aforementioned terms that are customary in the art. It refers both to rechargeable batteries (secondary batteries) and to non-chargeable batteries (primary batteries). More particularly, as used herein, a "battery" also embraces a single or individual "electrochemical cell." Preferably, as used herein, in a "battery," two or more such electrochemical cells are connected together, either in series (i.e., one after another) or in parallel.

Electrodes

The electrochemical cell of the invention has at least two electrodes, i.e., a positive (cathode) and a negative (anode) electrode.

The electrodes each comprise at least one active material. This material is capable of accepting or releasing lithium ions and at the same time of accepting and releasing electrons.

As used herein, the term "positive electrode" denotes the electrode which when the battery is connected to a consumer, as for example to an electrical motor, is capable of accepting electrons. In this nomenclature, it represents the cathode.

As used herein, the term "negative electrode" denotes the electrode which in operation is capable of releasing electrons. In this nomenclature, it represents the anode.

The electrodes can include inorganic material or inorganic compounds or substances which can be used for or in or on an electrode, or as an electrode. Under the operating conditions of the lithium-ion battery, on the basis of their chemical nature, these compounds or substances are able to accept (intercalate) lithium ions or metallic lithium and also release them again. As used herein, a material of this kind is referred to as "active cathode material" or "active anode material", respectively, or generally as "active material." For use in an electrochemical cell or battery, this active material is preferably applied to a support, preferably to a metallic support, preferably aluminum for the cathode and copper for the anode. This support is also referred to as a "collector" or collector foil.

Cathode (Positive Electrode)

As active material for the positive electrode or active cathode material, it is possible to use any of the common active cathode materials known in the art. These materials include, for example, LiCoO$_2$, NCM, NCA, high-energy NCM or HE-NCM, lithium iron phosphate, Li manganese spinel (LiMn$_2$O$_4$), Li manganese nickel oxide (LMNO), or lithium-rich transition-metal oxides of type (Li$_2$MnO$_3$)$_x$(LiMO$_2$)$_{1-x}$. With regard to the positive electrode, therefore, in the sense of the present invention, there is no restriction.

In one preferred embodiment, the active cathode material may be a material selected from a group which consists of a lithium transition-metal oxide (hereinafter also referred to as "lithium metal oxide"), layered oxides, spinels, olivine compounds, silicate compounds, and mixtures thereof. Active cathode materials of these kinds are described for example in Bo Xu et al. "Recent progress in cathode materials research for advanced lithium ion batteries", Materials Science and Engineering R 73 (2012) 51-65. Another preferred cathode material is HE-NCM. Layered oxides and HE-NCM are also described in patent specifications U.S. Pat. No. 6,677,082 B2, U.S. Pat. No. 6,680,143 B2, and U.S. Pat. No. 7,205,072 B2 to Argonne National Laboratory.

Examples of olivine compounds include lithium phosphates of empirical formula $LiXPO_4$ with X=Mn, Fe, Co or Ni, or combinations thereof.

Examples of lithium metal oxide, spinel compounds, and layered oxides include lithium manganate, preferably, $LiMn_2O_4$, lithium cobaltate, preferably, $LiCoO_2$, lithium nickelate, preferably, $LiNiO_2$, or mixtures of two or more of these oxides, or the mixed oxides thereof.

The active material may also include mixtures of two or more of the stated substances.

For increasing the electrical conductivity there may be further compounds present in the active material, preferably carbon-containing compounds, or carbon, preferably in the form of conductive carbon black or graphite. The carbon may also be introduced in the form of carbon nanotubes. Such additions are applied preferably in an amount of 0.1 to 10 wt %, more preferably 1 to 8 wt %, based on the mass of the positive electrode that is applied to the support.

Anode (Negative Electrode)

As active material for the negative electrode or active anode material, it is possible to use any of the active anode materials known in the art. With regard to the negative electrode, therefore, in the sense of the present invention, there is no restriction. In particular it is also possible to use mixtures of different active anode materials.

Examples of the active anode material used may be selected from the group which consists of lithium metal oxides, such as, lithium titanium oxide, metal oxides (e.g., $Fe_2O_3$, ZnO, $ZnFe_2O_4$), carbon-containing materials, such as, graphite (synthetic graphite, natural graphite), graphene, mesocarbon, doped carbon, hard carbon, soft carbon, fullerenes, mixtures of silicon and carbon, silicon, lithium alloys, metallic lithium, and mixtures thereof. As electrode material for the negative electrode, it is also possible to use niobium pentoxide, tin alloys, titanium dioxide, tin dioxide, and silicon.

The active anode material may also be a material which can be alloyed with lithium. This material may be a lithium alloy or an unlithiated or partially lithiated precursor thereof, which on formation produces a lithium alloy. Preferred materials which can be alloyed with lithium are lithium alloys selected from the group consisting of silicon-based, tin-based, and antimony-based alloys. Such alloys are described for example in the review article by W. J. Zhang, Journal of Power Sources, 196 (2011) 13-24.

Electrode Binder

The materials used for the positive or for the negative electrode, such as the active materials, for example, are held together by one or more binders, which hold these materials on the electrode and/or on the collector.

Examples of the binder or binders used may be selected from the group consisting of polyvinylidene fluoride (PVDF), polyvinylidene fluoride-hexafluoropropylene copolymer (PVDF-HFP), polyethylene oxide (PEO), polytetrafluoroethylene, polyacrylate, styrene-butadiene rubber, and carboxymethylcellulose (CMC), and mixtures and copolymers thereof. The styrene-butadiene rubber and optionally carboxymethylcellulose and/or the other binders such as PVDF are preferably in an amount of 0.5-8 wt %, based on the total amount of active material used in the positive or negative electrode.

Separator

The electrochemical cell of the invention contains a material which separates the positive electrode and the negative electrode from one another. This material is permeable for lithium ions, therefore conducting lithium ions, but is a nonconductor for electrons. Materials of this kind used in lithium-ion batteries are referred to as separators.

In one embodiment, polymers are used as separators. In one embodiment, the polymers are selected from the group consisting of: polyesters, such as polyethylene terephthalate, polyolefin, such as polyethylene and polypropylene, polyacrylonitrile, polyvinylidene fluoride, polyvinylidenehexafluoropropylene, polyetherimide, polyimide, polyethers, polyetherketone, or mixtures thereof. The separator has porosity, and so is permeable to lithium ions. In one preferred embodiment, the separator consists of at least one polymer.

Electrolyte

As used herein, the term "electrolyte" refers preferably to a liquid in which a conducting lithium salt is dissolved. The liquid is preferably a solvent for the conducting salt. In that case the conducting Li salt is preferably present in the form of an electrolyte solution.

The various aspects of the present invention are set out in more detail below.

In one aspect of the invention, an electrolyte is provided containing lithium hexafluorophosphate and lithium 2-pentafluoroethoxy-1,1,2,2-tetrafluoroethanesulfonate.

Lithium 2-pentafluoroethoxy-1,1,2,2-tetrafluoroethane sulfonate is also known as lithium 1,1,2,2-tetrafluoro-2-(pentafluoroethoxy)ethanesulfonate. Lithium 2-pentafluoroethoxy-1,1,2,2-tetrafluoroethanesulfonate can be synthesized via the commercially available perfluoro(2-ethoxyethane)sulfonic acid, as described in DE 102012101669 A1.

Surprisingly, it has been found that cells in which electrolytes use lithium hexafluorophosphate and lithium 2-pentafluoroethoxy-1,1,2,2-tetrafluoroethanesulfonate as the conducting salt exhibit higher cycling stability and improved battery service life in comparison with those that only use lithium hexafluorophosphate as the conducting salt. Moreover, the dissolution of the cathode material is suppressed. Lastly, self-discharge occurs to less of an extent.

Without being bound to any theory, it is assumed that the addition of lithium 1,1,2,2-tetrafluoro-2-(pentafluoroethoxy)ethanesulfonate to an $LiPF_6$-containing electrolyte results in formation in situ of a cathode passivation layer, which, particularly at end-of-charge potentials of more than 4.5 V versus $Li/Li^+$, kinetically inhibits the extraction of metals from the active cathode material and the oxidative decomposition of the electrolyte.

It is an advantage, moreover, that lithium 2-pentafluoroethoxy-1,1,2,2-tetrafluoroethanesulfonate exhibits high lithium-ion conductivity and good cathodic stability. Furthermore, lithium 2-pentafluoroethoxy-1,1,2,2-tetrafluoroethanesulfonate can be used across a wide temperature range.

Another advantage of using lithium 2-pentafluoroethoxy-1,1,2,2-tetrafluoroethanesulfonate, is its low sensitivity to hydrolysis.

Corrosion measurements in particular show that lithium 2-pentafluoroethoxy-1,1,2,2-tetrafluoroethanesulfonate exhibits no corrosion of the aluminum that is used as a current collector on the cathode side, but instead, like LiPF$_6$, forms a protective layer on aluminum. Lithium 2-pentafluoroethoxy-1,1,2,2-tetrafluoroethanesulfonate is therefore advantageously suitable as an additive for LiPF$_6$-containing electrolytes for commercial lithium-ion batteries.

The electrolyte of the invention preferably contains lithium hexafluorophosphate and lithium 2-pentafluoroethoxy-1,1,2,2-tetrafluoroethanesulfonate in solution in an organic solvent. The electrolyte can be prepared, for example, by introducing and dissolving lithium hexafluorophosphate and lithium 2-pentafluoroethoxy-1,1,2,2-tetrafluoroethanesulfonate in a solvent or a solvent mixture.

In preferred embodiments, based on the amount of lithium hexafluorophosphate used, there is 0.01 to 10 mol %, preferably 0.5 to 5 mol %, of lithium 2-pentafluoroethoxy-1,1,2,2-tetrafluoroethanesulfonate present in the electrolyte.

In preferred embodiments, the concentration of lithium hexafluorophosphate in the electrolyte is in the range from >0.1 M to <2 M, preferably in the range from >0.5 M to <1.5 M, more preferably in the range from >0.7 M to <1.2 M. In a particularly preferred embodiment, the concentration of lithium hexafluorophosphate in the electrolyte is 1 M.

In preferred embodiments, the electrolyte includes an organic solvent, an ionic liquid and/or a polymer matrix. The electrolyte preferably contains lithium hexafluorophosphate, lithium 2-pentafluoroethoxy-1,1,2,2-tetrafluoroethanesulfonate, and an organic solvent. It has been possible to observe that lithium 2-pentafluoroethoxy-1,1,2,2-tetrafluoroethanesulfonate has good solubility in organic solvents, particularly in cyclic or linear carbonates. This advantageously allows lithium 2-pentafluoroethoxy-1,1,2,2-tetrafluoroethanesulfonate to be used as an additive in LiPF$_6$-containing liquid electrolytes.

In preferred embodiments, the organic solvent is selected from ethylene carbonate (EC), propylene carbonate, diethyl carbonate, dimethyl carbonate, ethyl methyl carbonate (EMC), acetonitrile, glutaronitrile, adiponitrile, pimelonitrile, γ-butyrolactone, γ-valerol actone, dimethoxyethane, 1,3-dioxalane, methyl acetate, ethyl methanesulfonate, dimethyl methylphosphonate and/or a mixture thereof. Suitable organic solvents are selected more particularly from cyclic carbonates such as ethylene carbonate and propylene carbonate and/or linear carbonates such as diethyl carbonate, dimethyl carbonate, and ethyl methyl carbonate.

The organic solvent is preferably selected from ethylene carbonate, diethyl carbonate, dimethyl carbonate, ethyl methyl carbonate and/or mixtures thereof. A preferred solvent is ethylene carbonate. In accordance with the IUPAC nomenclature, ethylene carbonate is also known as 1,3-dioxolan-2-one. Ethylene carbonate is available commercially. Ethylene carbonate has a high boiling point and a high flash point. It is further advantageous that ethylene carbonate enables high conductivity as a result of effective salt dissociation.

In another preferred embodiment, the organic solvent contains a mixture of ethylene carbonate and at least one further organic solvent, preferably γ-butyrolactone. Also preferred are binary mixtures of carbonates, particularly of ethylene carbonate with a further carbonate, such as diethyl carbonate, dimethyl carbonate and/or ethyl methyl carbonate, especially ethyl methyl carbonate.

The ratio of ethylene carbonate to the at least one other organic solvent, preferably ethyl methyl carbonate, is preferably in the range from >1:99 to <99:1, more preferably in the range from >1:9 to <9:1, even more preferably in the range from ≥3:7 to ≤1:1. Unless otherwise indicated, the stated ratio is based on the weight fractions of the solvents. In a solvent mixture with ethylene carbonate and ethyl methyl carbonate in the ratio of 1:1, it is possible to achieve a high conductivity in a temperature range from −25° C. to +60° C.

Also preferred are ternary mixtures containing at least one carbonate as the solvent. Especially preferred are mixtures of ethylene carbonate with a further solvent, ethyl methyl carbonate for example, and with a compound capable of forming a solid electrolyte interphase (SEI), a solid-electrolyte interface. The electrolyte may also include additives, especially film-forming electrolyte additives. In preferred embodiments, the electrolyte can include a compound selected from chloroethylene carbonate, fluoroethylene carbonate, vinylene carbonate, vinylethylene carbonate, ethylene sulfite, ethylene sulfate, propanesulfonates, sulfites, preferably dimethyl sulfite and propylene sulfite, sulfates, butyrolactones optionally substituted by F, Cl or Br, phenylethylene carbonate, vinyl acetate and/or trifluoropropylene carbonate. Of the carbonate-based compounds, carbonates substituted by chlorine or fluorine are preferred, especially fluoroethylene carbonate (FEC). The compounds may improve the battery power, for example improving the capacity or the cycling lifetime. Fluoroethylene carbonate in particular may lead to improved long-term stability of a cell.

The electrolyte preferably includes at least one further additive, for example, a compound selected from chloroethylene carbonate, fluoroethylene carbonate, vinylene carbonate, vinylethylene carbonate, ethylene sulfite, ethylene sulfate, propanesulfonates, sulfites, such as dimethyl sulfite and propylene sulfite, sulfates, butyrolactones optionally substituted by F, Cl or Br, phenylethylene carbonate, vinyl acetate, trifluoropropylene carbonate or a mixture thereof. Preferably, the additive compound is fluoroethylene carbonate, present in the amount ranging from >0.1 wt % to <10 wt %, more preferably in the range from >1 wt % to <5 wt %, even more preferably in the range from >2 wt % to <3 wt %, based on the total weight of the electrolyte.

The organic solvent preferably contains a mixture of ethylene carbonate and at least one further organic solvent, preferably selected from linear carbonates, especially ethyl methyl carbonate, and fluoroethylene carbonate.

The fluoroethylene carbonate may form a protective layer on a graphite anode and lower over potentials of the electrode. Ionic liquids have further proven as highly promising solvents, since they combine a high thermal and electrochemical stability with a high ionic conductivity. This is advantageous especially for use with lithium 2-methoxy-1,1,2,2-tetrafluoroethanesulfonate. Preferred ionic liquids include a cation selected from 1-ethyl-3-methylimidazolium (EMI$^+$), 1,2-dimethyl-3-propylimidazolium (DMPI$^+$), 1,2-diethyl-3,5-dimethylimidazolium (DEDMI$^+$), trimethyl-n-hexylammonium (TMHA$^+$), N-alkyl-N-methylpyrrolidinium (PYR$_{IR}^+$), N-alkyl-N-methylpiperidinium (PIP$_{IR}^+$) and/or N-alkyl-N-methylmorpholinium (MORP$_{IR}^+$), and an anion selected from bis(trifluoromethanesulfonyl)imide (TFSI$^-$), bis(pentafluoroethanesulfonyl)imide (BETI$^-$), bis (fluorosulfonyl)imide (FSI$^-$), 2,2,2-trifluoro-N-(trifluoromethanesulfonyl)acetamide (TSAC$^-$), tetrafluoroborate (BF$_4^-$), pentafluoroethanetrifluoroborate (C$_2$F$_5$BF$_3^-$), hexafluorophosphate (PF$_6^-$) and/or tris(pentafluoroethane) trifluorophosphate ((C$_2$F$_5$)$_3$PF$_3^-$). Preferred N-alkyl-N-methylpyrrolidinium (PYR$_{IR}^+$) cations are selected from N-butyl-N-methylpyrrolidinium (PYR14$^+$) and/or N-methyl-N-propylpyrrolidinium (PYR13$^+$).

Preferred examples of ionic liquids are selected from N-butyl-N-methylpyrrolidinium bis(trifluoromethanesulfonyl)imide ($PYR_{14}TFSI$) and/or N-methyl-N-propylpyrrolidinium bis(trifluoromethanesulfonyl)imide ($PYR_{13}TFSI$).

Further suitable electrolyte materials are polymer electrolytes, where the polymer electrolyte may take the form of a gel polymer electrolyte or a solid polymer electrolyte. Solid polymer electrolytes exhibit good properties in terms of the requirements for future battery generations. They permit a solvent-free construction which is easy to produce and diverse in its form. Furthermore, the energy density can be increased, since the three-layer electrolyte-separator-electrolyte construction is done away with, with only a thin polymer foil needed between the electrodes. Generally speaking, solid electrolytes are chemically and electrochemically stable toward electrode materials, and, moreover, do not escape from the cell. Gel polymer electrolytes usually comprise an aprotic solvent and a polymer matrix.

Preferred examples of polymers for solid polymer electrolytes and gel polymer electrolytes include homo- or copolymers of polyethylene oxide (PEO), polypropylene oxide (PPO), polyvinylidene fluoride (PVDF), polyvinylidene fluoride-hexafluoropropylene (PVDF-HFP), polyacrylonitrile (PAN), polymethyl methacrylate (PMMA), polyethyl methacrylate (PEMA), polyvinyl acetate (PVAC), polyvinyl chloride (PVC), polyphosphazenes, polysiloxanes, polyvinyl alcohol (PVA) and/or homopolymers and (block) copolymers containing functional side chains selected from ethylene oxide, propylene oxide, acrylonitrile and/or siloxanes.

In another aspect of the invention, a lithium-ion battery is provided which includes an anode, a cathode, a separator, and an electrolyte according to the invention.

In preferred embodiments, the cathode contains an active cathode material selected from the group consisting of lithium metal oxide, layered oxides, spinels, olivine compounds, silicate compounds, HE-NCM, and/or NMC, and mixtures thereof. On account of their high-voltage stability, preference is given to active cathode materials selected from lithium nickel manganese cobalt mixed oxide (NMC), lithium nickel manganese oxide (LNMO) and/or lithium-rich transition-metal oxides of type $(Li_2MnO_3)_x(LiMO_2)_{1-x}$. In all three preferred cathode active materials, moreover, through the addition of lithium 2-pentafluoroethoxy-1,1,2,2-tetrafluoroethanesulfonate to the $LiPF_6$-containing electrolyte, it is possible to provide kinetic inhibition of disproportionation and extraction of manganese, and also other transition metals, from the active cathode material.

In preferred embodiments, the anode contains an active anode material selected from the group consisting of carbon, graphite, mixtures of silicon and carbon/graphite, silicon, lithium metal oxide, materials which can be alloyed with lithium, and mixtures thereof. Especially preferred is graphite.

In yet another aspect of the invention, a motor vehicle is provided which uses the lithium-ion battery according to the invention. The lithium-ion battery of the invention is particularly suitable for this purpose on account of its high-voltage stability.

Other objects, advantages and novel features of the present invention will become apparent from the following detailed description of one or more preferred embodiments when considered in conjunction with the accompanying examples and drawings.

DETAILED DESCRIPTION OF THE DRAWINGS

Example 1

Preparation of the Electrolyte Solutions

Figure 1:
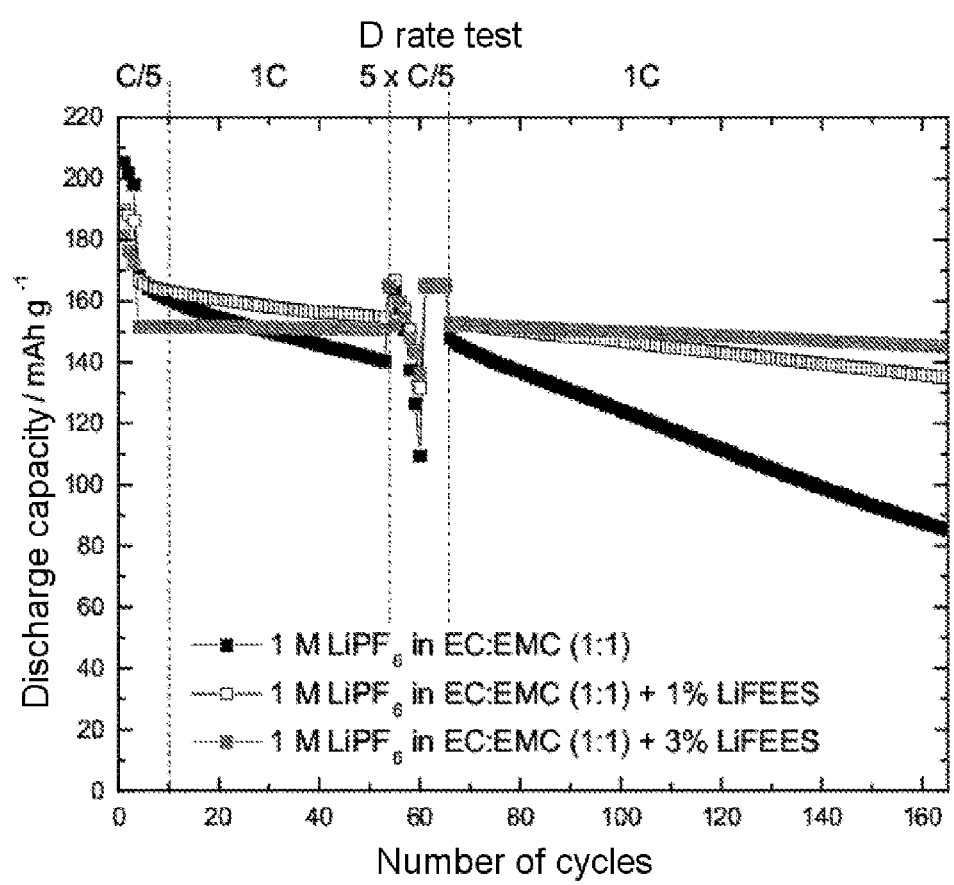
FIG. 1 shows the effect of lithium 2-pentafluoroethoxy-1,1,2,2-tetrafluoroethanesulfonate (LIFEES) as an additive in $LiPF_6$-containing electrolytes in lithium half-cells with NCM (4.6 V versus $Li/Li^+$) on the discharge capacity.

The electrolyte mixtures were prepared in a glovebox with $H_2O$ and $O_2$ content of less than 0.5 ppm. All mixing ratios stated are based on the mass ratio (wt %).

An electrolyte containing 1 M $LiPF_6$ in EC:EMC (1:1) was prepared by initially introducing 50 wt % of ethylene carbonate (EC) and 50 wt % of ethyl methyl carbonate (EMC) and dissolving the required amount of $LiPF_6$ in this solvent mixture, to get a concentration of 1 M $LiPF_6$. This electrolyte was used as a comparative electrolyte.

For preparing the additized electrolytes of the invention, lithium 2-pentafluoroethoxy-1,1,2,2-tetrafluoroethanesulfonate was added to this electrolyte mixture. The fraction in wt % of the additive (A) is based on the electrolyte (E) without additives, not on the overall electrolyte mixture including additives; i.e., w(A)=(A)/m(E). The water content of the electrolytes according to Karl-Fischer was less than 20 ppm.

Electrochemical Investigations

The experiments were conducted in a three-electrode arrangement in modified Swagelok® T-pieces (tube connectors, stainless steel body) with a nickel manganese cobalt oxide (NMC) electrode (12 mm diameter) or lithium nickel manganese oxide (LNMO) (12 mm diameter) as working electrode and with lithium foil (12 mm or 5 mm diameter, respectively) as counter electrode and reference electrode. The internal cell constituents were insulated from the stainless steel housing by a polyester film. The electrodes were separated by a glass fiber filter which was impregnated with the corresponding electrolyte (200 μL). On account of the sensitivity of the cell components to hydrolysis and to air, the cells were constructed in a glovebox.

Measurements at Constant Current

The measurements at constant current were carried out on a Series 4000 battery tester (from Maccor) at 20° C.±2° C. The NMC half-cells were cycled in the potential range from 3.0 V to 4.6 V versus $Li/Li^+$. For the LMNO half-cells, a potential range of 3.0 V to 4.95 V versus $Li/Li^+$ was selected.

The Test Plan Employed Was as Follows

After three forming cycles with a charge and discharge rate (C and D rate) of C/5 (here 150 mAh $g^{-1}$ correspond to a C rate of 1 C) the cycling behavior was verified over 50 cycles with a charge and discharge rate of 1 C. This was followed by a D rate test. The cells were discharged at different D rates from D/5 to 5D and charged in each case at C/2. The D rates employed here were D/5, D/3, D/2, 1D, 2D, 3D, and 5D. After the D rate test came five cycles with charge and discharge rates of C/5, in order to verify whether the cathode material has suffered damage as a result of the loading test. The last phase included the test of the long-term stability, where the cycling behavior with a charge and discharge rate of 1 C is monitored over 100 cycles.

Example 2

Determination of the Cycling Behavior of Lithium 2-pentafluoroethoxy-1,1,2,2-tetrafluoroethanesulfonate in an NMC Half-Cell The preparation of an electrolyte containing 1 M lithium hexafluorophosphate (LiPF$_6$) in a solvent mixture of ethylene carbonate and ethyl methyl carbonate (EC:EMC 1:1) with the addition of 1 wt % or 3 wt % of lithium 2-pentafluoroethoxy-1,1,2,2-tetrafluoroethanesulfonate took place as described under example 1. The cycling behavior was determined using an NMC half-cell at constant current as described above.

FIG. 1 plots the discharge capacity against the number of cycles of 1 M LiPF$_6$ in a solvent mixture of ethylene carbonate and ethyl methyl carbonate (EC:EMC 1:1) with and without the addition of 1 wt % or 3 wt % of lithium 2-pentafluoroethoxy-1,1,2,2-tetrafluoroethanesulfonate in an NMC half-cell. As FIG. 1 shows, the addition of lithium 2-pentafluoroethoxy-1,1,2,2-tetrafluoroethanesulfonate reduced the drop in the discharge capacity with increasing number of cycles (capacity fading). With increasing fraction of lithium 2-pentafluoroethoxy-1,1,2,2-tetrafluoroethanesulfonate, there was a slowdown in capacity fading, but the discharge capacity achieved in the initial cycles was also lower.

Example 3

Investigation of the Internal Resistance of Lithium 2-pentafluoroethoxy-1,1,2,2-tetrafluoroethanesulfonate in an NMC Half-Cell Preparation of the electrolytes and construction of the cells took place as in example 1. After the forming of the cells at a rate of C/5 in the potential range from 3.0 V to 4.6 V versus Li/Li$^+$, the cells were equilibrated for five hours while the open circuit voltage was measured. The AC impedance of both cells was measured in the frequency range from 1 MHz to 1 mHz (amplitude 5 mV) at 20° C.

Figure 2:
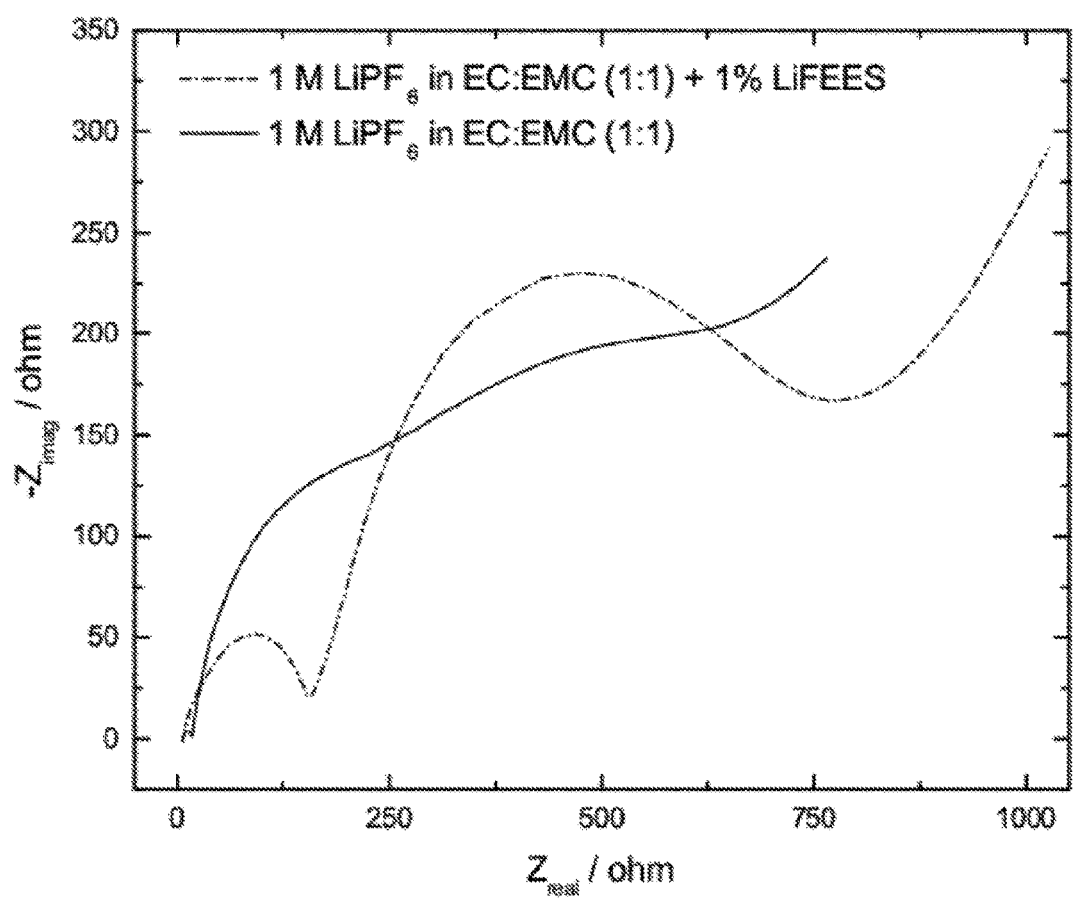
FIG. 2 shows the effect of lithium 2-pentafluoroethoxy-1,1,2,2-tetrafluoroethanesulfonate (LIFEES) as an additive in $LiPF_6$-containing electrolytes on the internal resistance of the cell.

FIG. 2 shows the Nyquist plot of 1 M LiPF$_6$ in a solvent mixture of ethylene carbonate and ethyl methyl carbonate (EC:EMC 1:1) with and without the addition of 1 wt % of lithium 2-pentafluoroethoxy-1,1,2,2-tetrafluoroethanesulfonate in an NMC half-cell. As FIG. 2 shows, the addition of lithium 2-pentafluoroethoxy-1,1,2,2-tetrafluoroethanesulfonate produced a higher outer-layer resistance, which comes about likely as a result of the oxidative decomposition of lithium 2-pentafluoroethoxy-1,1,2,2-tetrafluoroethanesulfonate and an associated formation of a passivation layer on the NMC cathode.

Example 4

Figure 3:
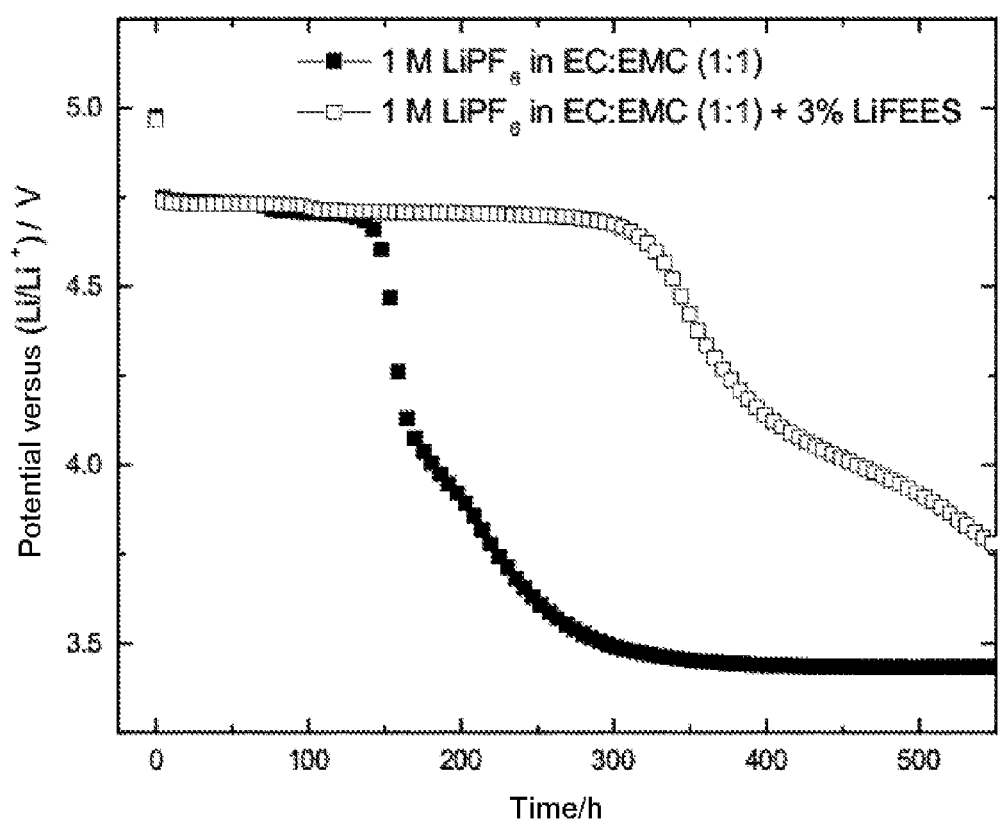
FIG. 3 shows the effect of lithium 2-pentafluoro ethoxy-1,1,2,2-tetrafluoroethanesulfonate (LIFEES) as an additive in $LiPF_6$-containing electrolytes on the self-discharge in LMNO half-cells (4.95 V versus $Li/Li^+$).

Measurement of the Self-Discharge of Lithium 2-pentafluoroethoxy-1,1,2,2-tetrafluoroethanesulfonate in an LMNO Half-Cell FIG. 3 shows the self-discharge of a lithium-ion half-cell with 1 M lithium hexafluorophosphate (LiPF$_6$) in a solvent mixture of ethylene carbonate and ethyl methyl carbonate (EC:EMC 1:1) with and without the addition of 3 wt % of lithium 2-pentafluoroethoxy-1,1,2,2-tetrafluoroethanesulfonate. The working electrode used was the cathode material lithium nickel manganese oxide (LMNO). The electrolyte was prepared and the cell constructed as in Example 1. After three forming cycles at C/5 in the potential range from 3.0 V to 4.95 V versus Li/Li$^+$, charging again took place up to an end-of-charge potential of 4.95 V versus Li/Li$^+$, after which the open circuit voltage between the LMNO electrode and the lithium reference electrode was monitored over time. As FIG. 3 shows, the addition of 3 wt % of lithium 2-pentafluoroethoxy-1,1,2,2-tetrafluoroethanesulfonate reduced the self-discharge. The profile of the self-discharge follows the course of the discharge curve of the cathode material.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An electrolyte for a lithium-ion battery, the electrolyte comprising:
   lithium hexafluorophosphate; and lithium 2-pentafluoroethoxy-1,1,2,2-tetrafluoroethanesulfonate.

2. The electrolyte according to claim 1, wherein the lithium 2-pentafluoroethoxy-1,1,2,2 tetrafluoroethanesulfonate is present in the amount of 0.01 to 10 mol %, based on the amount of lithium hexafluorophosphate present.

3. The electrolyte according to claim 1, wherein the lithium 2-pentafluoroethoxy-1,1,2,2 tetrafluoroethanesulfonate is present in the amount of 0.5 to 5 mol %, based on the amount of lithium hexafluorophosphate present.

4. The electrolyte according to claim 1, wherein the concentration of lithium hexafluorophosphate ranges from 0.1 M to 2 M.

5. The electrolyte according to claim 1, wherein the concentration of lithium hexafluorophosphate ranges from 0.5 M to 1.5 M.

6. The electrolyte according to claim 1, wherein the concentration of lithium hexafluorophosphate ranges from 0.7 M to 1.2 M.

7. The electrolyte according to claim 1, wherein the electrolyte further comprises an organic solvent, an ionic liquid and/or a polymer matrix.

8. The electrolyte according to claim 7, wherein the organic solvent is selected from the group consisting of ethylene carbonate, propylene carbonate, diethyl carbonate, dimethyl carbonate, ethyl methyl carbonate, acetonitrile, glutaronitrile, adiponitrile, pimelonitrile, γ-butyrolactone, γ-valerolactone, dimethoxyethane, 1,3 dioxalane, methyl acetate, and mixtures thereof.

9. The electrolyte according to claim 7, wherein the organic solvent is selected from the group consisting of ethylene carbonate, diethyl carbonate, dimethyl carbonate, ethyl methyl carbonate, and mixtures thereof.

10. The electrolyte according to claim 7, wherein the organic solvent comprises a mixture of ethylene carbonate and at least one further organic solvent in a ratio of 1:99 to 99:1.

11. The electrolyte according to claim 7, wherein the organic solvent comprises a mixture of ethylene carbonate and at least one further organic solvent in a ratio of 1:9 to 9:1.

12. The electrolyte according to claim 7, wherein the organic solvent comprises a mixture of ethylene carbonate and at least one further organic solvent in a ratio of 3:7 to 1:1.

13. The electrolyte according to claim 10, wherein the at least one further organic solvent is ethyl methyl carbonate.

14. The electrolyte according to claim 1, wherein the electrolyte further comprises a compound selected from chloroethylene carbonate, fluoroethylene carbonate, vinylene carbonate, vinylethylene carbonate, ethylene sulfite, ethylene sulfate, propanesulfonates, sulfites, sulfates, butyrolactones optionally substituted by F, Cl or Br, phenylethylene carbonate, vinyl acetate and/or trifluoropropylene carbonate.

15. A lithium-ion battery comprising:
an anode;
a cathode;
a separator; and
an electrolyte comprising lithium hexafluorophosphate and lithium 2-pentafluoroethoxy-1,1,2,2-tetrafluoroethanesulfonate.

16. The lithium-ion battery according to claim 15, wherein the cathode comprises an active cathode material selected from the group consisting of lithium metal oxide, layered oxides, spinels, olivine compounds, silicate compounds, HE-NCM, and mixtures thereof.

17. The lithium-ion battery according to claim 15, wherein the anode comprises an active anode material selected from the group consisting of carbon, graphite, mixtures of silicon and carbon/graphite, silicon, lithium metal oxide, materials which can be alloyed with lithium, and mixtures thereof.

18. A motor vehicle comprising a lithium-ion battery as claimed in claim 15.

* * * * *